March 24, 1931.  E. J. SVENSON  1,797,705
MACHINE TOOL
Filed Sept. 17, 1928  3 Sheets-Sheet 1

Inventor
Ernest J. Svenson,

March 24, 1931. E. J. SVENSON 1,797,705
MACHINE TOOL
Filed Sept. 17, 1928 3 Sheets-Sheet 2
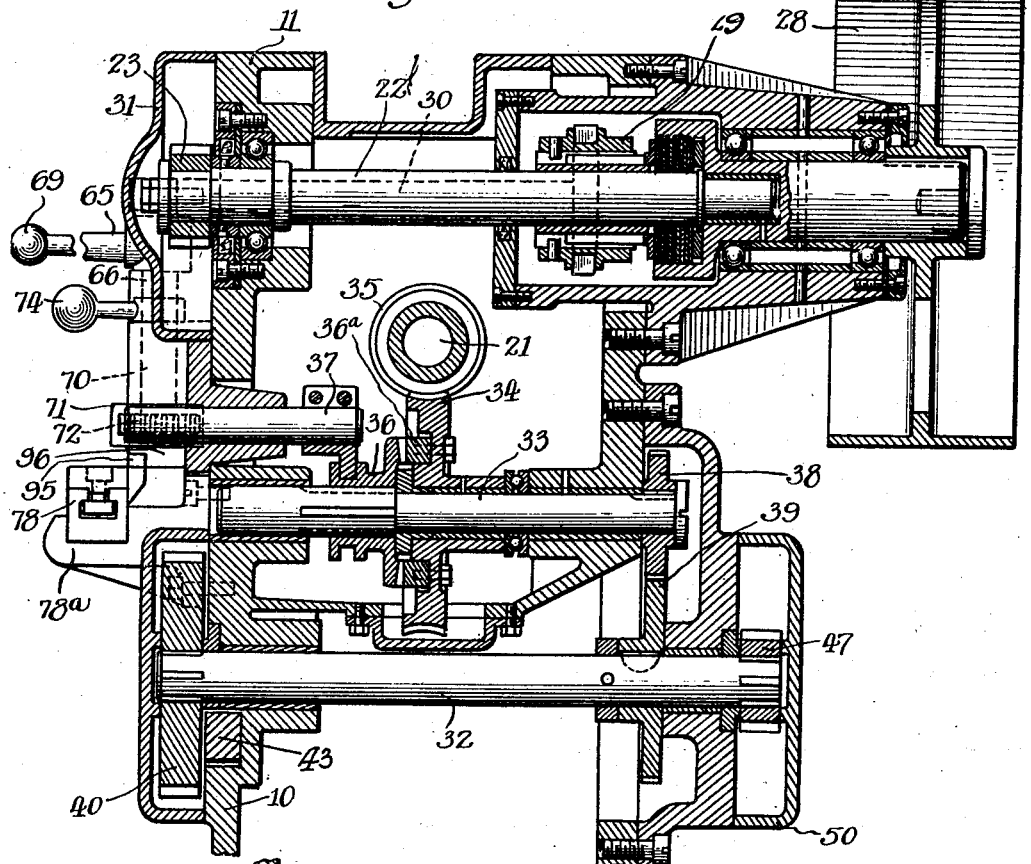
Fig. 2.
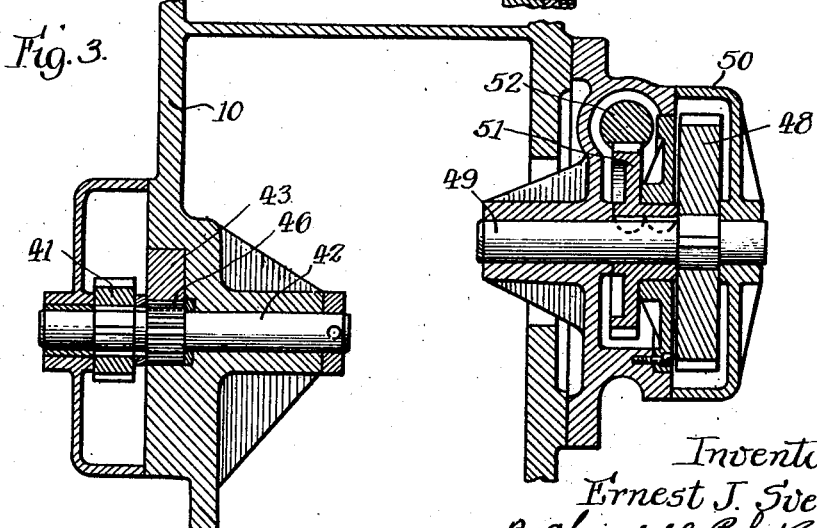
Fig. 3.
Inventor:
Ernest J. Svenson,
By Churchill Parker Carlson
Attys.

March 24, 1931. E. J. SVENSON 1,797,705
MACHINE TOOL
Filed Sept. 17, 1928 3 Sheets-Sheet 3

Inventor
Ernest J. Svenson

Patented Mar. 24, 1931

1,797,705

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

MACHINE TOOL

Application filed September 17, 1928. Serial No. 306,306.

The invention relates to machine tools and more particularly to a substantially automatic lathe adapted to perform a plurality of operations on a work piece and to provide a high rate of production.

It is the general object of the invention to provide a lathe of new and improved construction embodying a simplified mechanism for actuating a plurality of tool supports and which is particularly efficient in operation and lends itself readily to manufacture at a low cost.

Another object of the invention is to provide a lathe which is automatic, except for certain of its movements which are capable of being most rapidly performed manually, and which embodies a simple control mechanism adapted in the cycle of operation of the machine automatically to transfer the control of the movement of the tool supports, first from the manual to the automatic means and then back to the manual means.

Another object of the invention is to provide a lathe embodying novel means manually operable to advance and return the front carriage and rear tool support.

A further object auxiliary to the foregoing object resides in the provision of means operable during the manual operation of the front carriage automatically to supplant the manually operable means by a power drive for the carriage immediately prior to the engagement of the tools thereon with the work piece.

A further object of the invention is to provide a lathe of this character embodying a combined manual and automatic control for the tool supports arranged so that during a manually operated approach of the tools toward the work piece the spindle is started as the tools near the point of engagement with the work and subsequently the feed drive is engaged just before the engagement of the tools with the work to feed the tools at a cutting speed during the cutting operation, after which the feed drive is automatically disengaged to permit a manual return movement of the tools, during which movement the spindle is stopped.

Another object of the invention is the provision of an improved lathe of this character embodying a single feed shaft for moving the front carriage and the rear cross slide to and away from the piece of work and including change speed means for varying the stroke of each independently of the other.

Additional objects and advantages will become apparent as the description proceeds as well as from the accompanying drawings in which:

Figure 1 is a fragmentary front elevation of a preferred form of the invention with the pick-off gears and gear casing for the front carriage removed.

Figs. 2 and 3 are fragmentary vertical sections through the head stock taken on the lines 2—2 and 3—3 of Fig. 1 respectively.

Figure 5A:
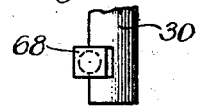
Fig. 5 is a fragmentary front elevational view on an enlarged scale showing in detail the exemplary form of automatic control means.
Figure 5:
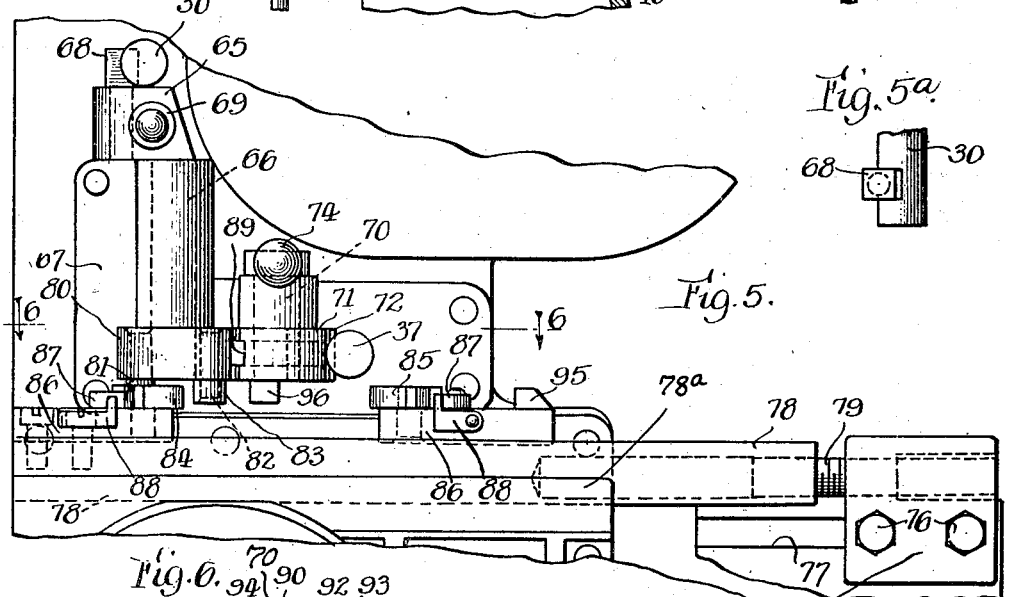

Fig. 5ª is a detail view of the operating connection for the main clutch.

Figure 6:
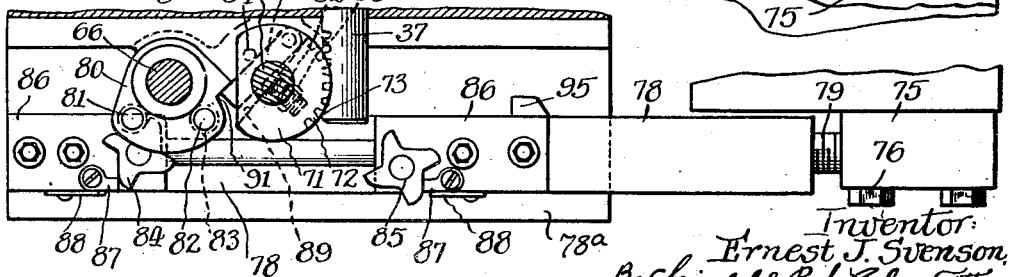

Fig. 6 is a horizontal sectional view of the control means taken on the line 6—6 of Fig. 5.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In attaining the objects, the invention contemplates the provision of a simplified feed mechanism which includes a clutch controlled driving shaft for operating the spindle and also serving to drive a clutch controlled feed shaft. The feed shaft in turn effects a feeding movement of the front carriage and of the rear cross slide in a feeding direction only, the rear carriage and front cross slides being adjustable manually as required by a particular piece of work. A manually operable means for rapidly moving the front carriage and the rear cross slide in either direction is provided in connection with the feed mechanism to permit the rapid approach and the rapid return movements of the front carriage and rear cross slide to be effected by hand.

Also associated with the feed mechanism is a control means which operates upon the movement of the front carriage to a predetermined point near the work piece, first to actuate the main clutch to start the spindle and the feed shaft and subsequently to move the feed clutch into engagement to drive the front carriage and rear cross slide through the feed stroke. The control means is further operable, upon completion of the cutting operation to effect the disengagement of the feed clutch to stop the carriage and, at the start of the manually operated rapid return of the carriage, to disengage the main clutch to stop the spindle.

Figure 1:
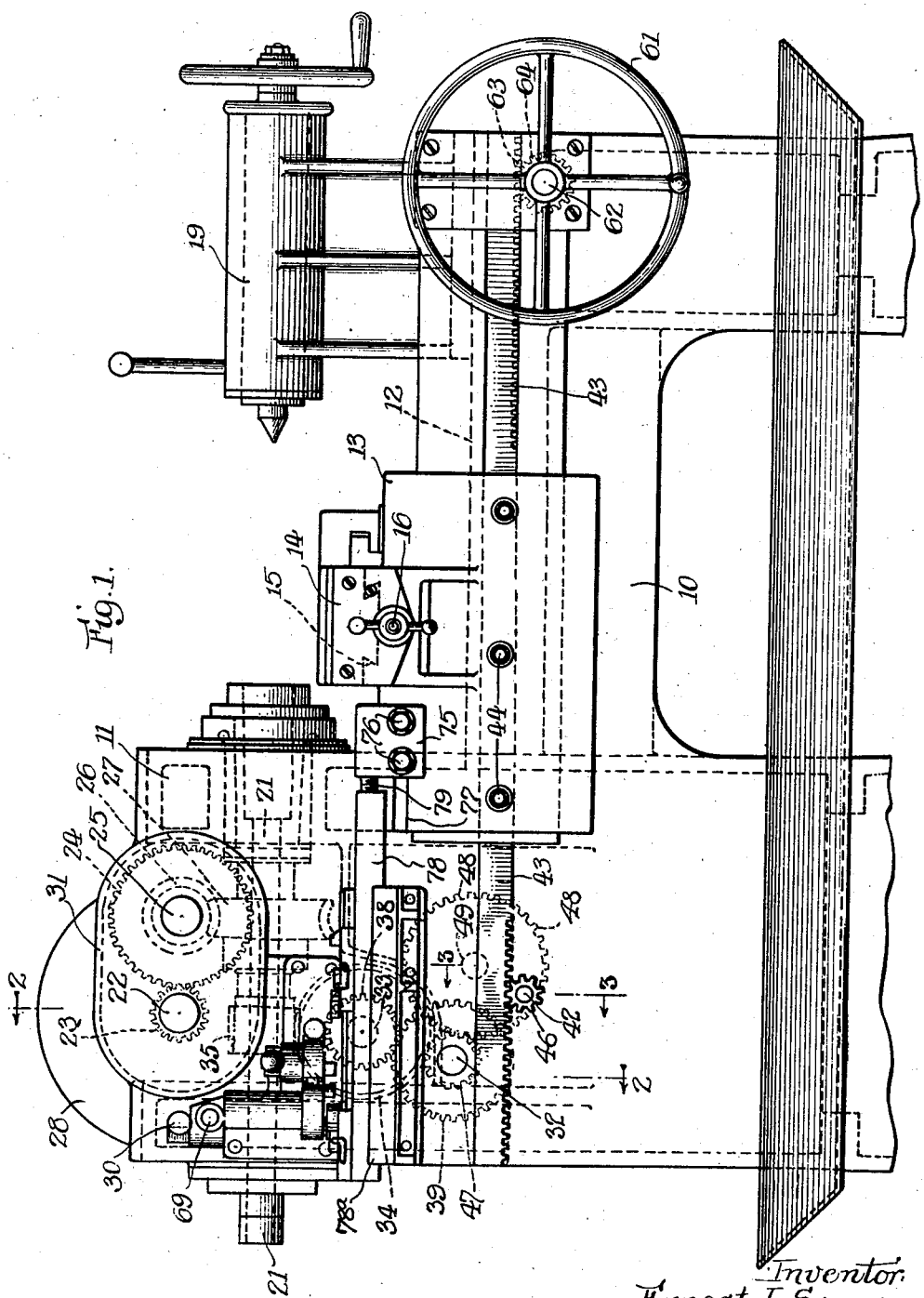
Figure 4:
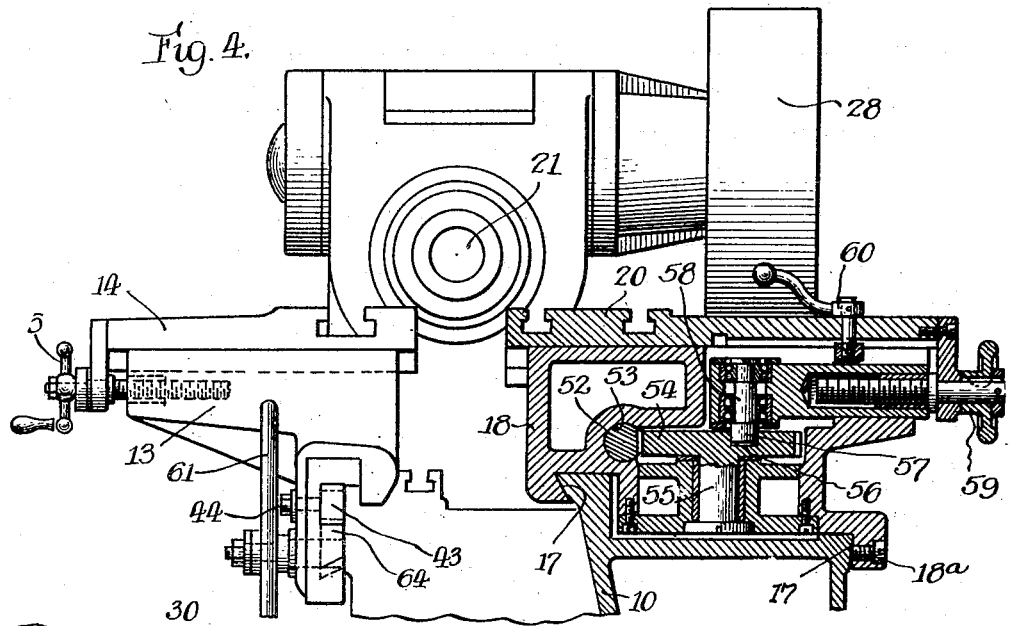
Fig. 4 is a fragmentary tail end view with the tailstock removed, showing the rear carriage and cross slide in section.

More particularly described, referring to Fig. 1, the invention comprises generally a bed 10 having a headstock 11 preferably formed integrally therewith. The bed is provided with longitudinal ways 12 along the forward face thereof upon which a front carriage 13 is movably mounted. This carriage has a cross slide 14 mounted on suitable ways 15 thereon for adjustment transversely of the lathe. For this purpose a generally well-known type of adjusting screw 16 is employed. The bed is also provided with a pair of ways 17 (Fig. 4) along the rear upper surface thereof upon which a rear carriage 18 is adjustably mounted. Such means as the set-screws 18ª may be provided to maintain the rear carriage in any of its positions of adjustment. The rear carriage carries a rear cross slide 20 thereon, which is mounted for driven movement as will hereinafter become apparent. Intermediate the ways for the front and rear carriage is positioned a set of ways (not shown) upon which a tailstock 19 may be adjustably supported.

A work spindle 21 is rotatably supported in longitudinally spaced bearings in the headstock 11 and is arranged to be driven from a main drive shaft 22 (Fig. 2), which extends transversely of the lathe, by means including a pair of pick-off gears 23, 24, a shaft 25 and the worm and worm wheel 26 and 27. The main drive shaft 22 is arranged to be driven by means of a pulley 28 which in this embodiment is journaled in the headstock and is adapted to be connected to the shaft by means of a main clutch 29 controlled by a shiftable actuator rod 30. The shaft 25 is journaled in the headstock parallel to the main drive shaft with the pick-off gears 23, 24 splined onto the forward ends of the shafts 22 and 25 in the usual manner and enclosed by a suitable detachable cover 31.

Feed mechanism

The feed mechanism by which simultaneous movement of the front carriage and rear cross slide is effected includes a common feed shaft 32 (Fig. 2) extending transversely of the lathe bed parallel to the main driving shaft 22, and means for driving the shaft in one direction at a desired feed rate.

In this instance, the feed shaft 32 is driven from the spindle 21 which, as has been previously mentioned, is driven from the main drive shaft 22. The connection between the spindle and the feed shaft comprises in this instance a jack shaft 33 (Fig. 2) journaled transversely of the bed of the machine upon which is loosely mounted a worm wheel 34 adapted to engage a worm 35 rigidly carried upon the spindle. Driving connection between the worm wheel and the jack shaft is effected by means of a suitable clutch member 36 splined upon the jack shaft for movement axially thereof into and out of engagement with a complementary clutch member 36ª mounted upon the worm wheel. Movement of the clutch member 36 is controlled by means of a shiftable actuator rod 37 extending transversely of the headstock.

One end of the jack shaft 33 carries a gear 38 arranged to mesh with a second gear 39 rigid upon the feed shaft 32. Thus a driving connection between the main drive shaft 22 and the feed shaft 32 through the intermediate spindle 21 is provided which permits of independent operation of the spindle and which prevents operation of the feed shaft when the spindle is idle.

The feed shaft 32 is arranged to drive both the front carriage 13 and the rear cross slide 20. To this end the feed shaft is connected to drive the front carriage by means comprising a pair of change speed pick-off gears 40 and 41 (Figs. 2 and 3). The gears 40 and 41 are omitted in Fig. 1. The pick-off gear 40 is suitably splined upon the forward end of the feed shaft. The other of said pick-off gears is splined upon a stub shaft 42 rotatably mounted in the front side of the bed at an appropriate point substantially in longitudinal alinement with the lower portion of the front carriage. The front carriage carries an elongated bar 43 rigidly secured thereto, as by means of the bolts 44, which bar extends longitudinally along the front side of the bed from either side of the carriage. The disposition of the bar on the carriage is such that one end of the bar (the forward or left in the drawings) extends above and substantially adjacent to the short shaft 42 and is provided with rack teeth 45 upon its lower side arranged to engage a pinion 46 mounted upon and rotatable with the short shaft 42. Thus rotation of the feed shaft will effect a movement of the carriage longitudinally of the bed of the lathe through the pick-off gears 40, 41, the pinion 46 and the rack 45 on the bar 43.

The driving connection between the feed shaft and the rear cross slide comprises a pair of pick-off gears 47, 48 (Figs. 2 and 3) one of which is mounted upon the other or rear end of the feed shaft 32. The other of the pick-off gears is suitably mounted upon a short shaft 49 (Fig. 3) journaled in the rear side of the bed and the pick-off gears are enclosed by a suitable detachable cover 50.

The short shaft 49 also carries a pinion gear 51 rigidly thereon which engages rack teeth formed on a bar 52 (Fig. 3) mounted for sliding movement longitudinally of the bed. The other end of the bar 52 (Fig. 4) is slidably supported in a suitable passage-way 53 provided in the rear carriage 18 and rack teeth formed upon the side of the bar mesh with a gear 54 mounted upon a vertical shaft 55 journaled in the lower portion of the rear carriage.

A spiral cam slot 56, having any desired slope, is provided in the upper face of the pinion gear 54 and is arranged to be engaged by a cam roller 57 carried upon the depending end of the cam follower 58 vertically mounted in the lower portion of the rear cross slide 20. Thus rotation of the feed shaft 32 effects a feed movement of the rear cross slide through the pick-off gears 47, 48, the pinion, rack, and gear connection 51, 52 and 54 and the cam connection between the gear 54 and the rear cross slide 20.

In order to adjust the rear cross slide relative to the rear carriage and independently of the driving means, a generally well-known adjusting screw device 59 is provided between the upper or tool supporting portion of the cross slide and the lower or power actuated portion, and a suitable clamping device 60 is employed to maintain the upper and lower portions of the cross slide in the desired position attained by means of the adjusting device.

By providing separate sets of pick-off gears 40, 41 and 47, 48 in the driving connections between the feed shaft on the one hand and each of the tool supports on the other, it becomes possible to vary the speed of movement and consequently the length of stroke of one support independently of the other. Thus it is possible to employ the simple single feed shaft construction without impairing the adjustability of the machine in accommodating it to different tooling operations.

The driving connection which has just been described is effective only to move the tool supports in one direction, i. e. through a feeding movement during which the cutting operation occurs. The traverse or non-cutting movements of the front carriage and the rear cross slide are preferably performed manually since, in the smaller sizes of lathes, such a manual operation may be more rapidly and efficiently accomplished and requires but little effort on the part of the operator.

The manual control in the present embodiment comprises a hand wheel 61 (Fig. 1) rigidly mounted upon a shaft 62 suitably journaled in the bed of the lathe. Herein the shaft 62 is positioned near the tail end of the lathe adjacent and underlying the bar 43 carried by the front carriage. Rack teeth 63 are provided upon the lower face of the bar to engage a suitable pinion 64 rigidly carried by the hand wheel shaft 62. In this manner rotation of the hand wheel 61 effects a movement of the front carriage toward or away from a piece of work mounted in the lathe.

Simultaneously, movement of the front carriage by the hand wheel effects a rotation of the feed shaft through the driving connection therewith to move the rear cross slide toward or away from the piece of work through its connection with the feed shaft. It is desirable that this arangement of parts be employed in order to simplify the operation of the lathe, since it permits an operator standing centrally of the lathe to move the hand wheel in the desired direction of carriage travel by grasping the upper part of the hand wheel, which part is the most convenient to his hand.

Control

The automatic control mechanism in the present embodiment contemplates the provision of a means which automatically operates the feed clutch to initiate the feeding movement of the tool supports at a predetermined point in the manually actuated approach movement of the tool supports to the work piece. The control mechanism also operates to disengage the feed clutch to stop the feeding movement of the tool supports after the cut has been completed.

The operation of the spindle is also preferably controlled by the traverse movements of the tool supports, the control being operable to engage the main clutch to start the spindle during the approach of the tool supports and to stop the spindle during the return thereof.

Referring to Figs. 2 and 5, the shiftable actuator 30 which controls the main clutch 29 is provided with a means for manually controlling the engagement of the clutch. To this end an arm or hand lever 65 is mounted upon the upper end of a vertical shaft 66 supported in a suitable bracket 67 upon the head stock of the lathe. The arm 65 carries an upstanding pin having a squared end 68 (Fig. 5ª) which engages a slot formed in the side of the shiftable actuator 30 near the forward end thereof, and has a handle 69 mounted thereon. Swinging movement of the hand lever in one direction or the other causes a transverse movement of the shiftable actuator 30 in the headstock to effect an engagement or disengagement of the main clutch to start and stop the machine.

A manual control is also provided for the feed clutch 36 (Fig. 2) and in this instance comprises a vertically disposed shaft 70 also journaled in the bracket 67, which shaft carries at the lower end thereof a mutilated disk 71 (Figs. 5 and 6) having gear teeth 72 formed upon a segmental portion of the periphery thereof to engage rack teeth 73 formed upon the end of the shiftable actuator 37 for the feed clutch. An operating handle 74 rigid with the upper end of the shaft 70 permits rocking motion to be imparted to the shaft, thereby effecting a transverse movement of the shiftable actuator 37 in the headstock to engage and disengage the feed clutch and control the drive of the feed shaft from the spindle.

Means arranged for movement with the front carriage is provided automatically to operate both the main clutch 29 and the feed clutch 36 which means is adjustable to permit the clutches to be operated at any desired predetermined point in the movement of the front carriage. To this end a block 75 (Figs. 1, 5 and 6) is mounted for slidable adjustment on the upper portion of the carriage in any suitable manner as by means of the bolts 76 on the block arranged to engage a longitudinally extending T-slot 77 in the carriage.

A control bar 78 is connected for movement with the block as by means of the pin 79 screw-threaded into both the block and the control bar to provide further means for adjustment. Preferably the free end of the control bar is supported in a bracket 78ª on the bed 10 for sliding movement relative thereto and the disposition and arrangement of parts is such that the control bar extends adjacent one side and beneath the lower ends of the vertically disposed clutch control shafts 66 and 70 of the control mechanisms for the main and feed clutches. Means carried by the control bar is arranged to rock the control shafts in one direction or the other as the control bar moves through certain positions. Thus the vertical control shaft 66 for the main clutch carries a mutilated disk 80 (Figs. 5 and 6) rigidly mounted on its lower end. A portion of the disk extends laterally of the shaft to a position overlying the control bar 78 and this portion of the disk carries a pair of pins 81, 82 depending toward the surface of the control bar. If desired, anti-friction rollers 83 may be carried by the pins. The control bar carries upon the upper surface thereof a pair of trip members in the form of spaced star wheels 84 and 85 journaled on adjustable brackets 86 for rotation in a horizontal plane and positioned so that the points of the wheels may engage the depending pins on the disk. The wheels are substantially similar and are held against rotation in one direction by similar ratchet means which preferably comprises pawls 87 pressed into engagement with the back side of the points on the wheels by springs 88.

As may be seen in Fig. 6, the star wheels and pawls are disposed so that the wheels rotate in opposite directions. Thus the star wheel 84 on the forward (left hand) end of the control bar is mounted for counter-clockwise rotation and the rear (right hand) star wheel 85 is mounted for clock-wise rotation. Preferably, the position of the forward star wheel 84 is such that in the remote position of the front carriage from the work the projections on the wheel are forwardly of the pin 82 on the disk 80. Thus during the rapid approach of the carriage one of the points on the forward star wheel 84 engages the pin 81 on the disk 80 to rock the vertical shaft 66 and engage the main clutch.

Preferably, the automatic means which controls the feeding movement of the tool supports, is associated with the spindle control mechanism in such a manner that the feed clutch will be engaged just after the spindle has started to rotate. In this embodiment, the actuating disk 71 on the lower end of the vertical feed clutch control shaft 70 is slotted to provide a semi-circular recess therein having a substantially diametrically extending side wall 89 (Fig. 6).

An arm 90, pivotally mounted at one side of the recess, so that one side of the arm may abut the side 89, projects beyond the periphery of the disk 71 into engagement with an abutment 91 in the form of a shoulder positioned upon the main clutch control disk 80. Suitable means such as the helical spring 92 seated in a bore 93 in the disk 71 and bearing against the arm 90 tends to maintain the projecting end of the arm in engagement with one side of the abutment. A pin 94 is mounted on the disk 71 to limit the swinging movement of the arm away from the side of the recess.

In operation, as the main clutch control disk 80 is engaged and rotated by the star wheel 84 on the control bar, the engagement between the abutment 91 and the arm 90 moves the arm against the side of the recess 89 and swings the feed clutch control disk 71 to move the feed clutch into operative engagement. The lost motion connection attained by the pivoted arm is sufficient to insure that the feed clutch will not be thrown into engagement until after the main clutch has been engaged to start the spindle.

The means by which the feed clutch is disengaged from its driving connection with the front carriage at the completion of the cut comprises a stop member 95 projecting from the control bar, which stop is arranged to engage a semi-circular lug 96 (Fig. 5) depending from the feed clutch control disk 71. The clutch engaging movement of the feed control disk 71 has moved the arm 90 to such a position that the end of the arm is free to swing past the abutment on the main clutch control disk so that upon engagement of the feed stop 95 with the lug 96, the disk is swung in a return direction to disengage the feed clutch without affecting the spindle control mechanism. In this manner the tool supports may be automatically disengaged from the feed drive at the completion of the work cut to permit the supports to be returned to their remote position by the manual control mechanism.

It will be seen during the feeding that movement of the tool supports the forward star wheel 84, which initiates the rotation of the spindle, has moved out of engagement with the depending pin 81 and the rear star wheel 85 has engaged the second depending pin 82 and has been rotated one notch to permit the star wheel to pass the pin. The return movement of the tool supports under the manual control therefore moves the rear star wheel 85 into engagement with the depending pin 82 to effect a reverse rocking movement of the main clutch control disk 80 to disengage the main clutch and stop the spindle. As the carriage approaches its remote position the outstanding projection on the forward star wheel 84 engages the depending lug 81 and rotates the wheel one notch to permit the wheel to pass the pin and return to its initial position.

*Operation*

In considering the operation of the machine, it is assumed that the rear carriage and the front cross slide have been secured by means of the clamping devices 18ª and 16 in predetermined positions upon the bed of the lathe and the front carriage respectively, and that a piece of work has been mounted between the head stock and the tail stock. The front carriage and the rear cross slide will then be at their remote positions from the work piece i. e. with the carriage withdrawn to the right of the piece and the rear cross slide withdrawn rearwardly. By moving the upper part of the hand wheel 61 toward the piece of work the front carriage is advanced toward the work. Simultaneously the feed mechanism is rotated through the driving connection of the front carriage therewith to effect a similar approach of the rear cross slide. At a predetermined point prior to the engagement of any of the tools with the work piece, the star wheel 84 on the control bar 78 strikes the pin 81 thereby actuating the main clutch control and engaging the clutch 29.

Further movement of the main clutch disk 80 swings the feed clutch control disk 71 through the lost motion connection therebetween to engage the feed clutch and drive the jack shaft 33. Further movement of the carriage 13 by the manual operating means is at once prevented by this engagement and the tools are fed at a low speed into engagement with the work.

At the completion of the cut the stop 95 (Fig. 5) on the control bar strikes the depending lug 96 on the feed clutch control disk 71 and swings the disk to disengage the feed clutch. The tool supports may then be returned to their remote positions by the manual control and in doing so the engagement of the star wheel 85 with the depending pin 82 swings the disk 80 to disengage the main clutch and stop the spindle. After the tool supports have been returned to their initial positions, the finished work piece may be removed from the lathe and a new piece inserted.

It will be apparent from the foregoing that the invention provides a machine which is completely automatic except for the rapid approach movement of the tools toward the work and for the return movement of the tools to their initial positions after the cut has been completed. By providing a control means which is operable to supplant the manually actuated approach of the tools at a predetermined point prior to the engagement of the tools with the work, the possibility of moving the tools into engagement with the work so rapidly as to break the tools is eliminated. In addition the control means stops the feeding movement of the carriage at the end of the cut thereby permitting operation of the manual actuating means to return the carriage and the rear cross slide 28 to their remote positions. The unitary feed mechanism driven from the spindle and drivingly connected to both the front carriage and the rear cross slide permits of a simplified construction and control and this together with the simple and effective control mechanism provides a control for the lathe which is simple and rugged in construction and effective in operation.

It will also be seen that with the combined manual and automatic control features for moving the front carriage and the rear cross slide through their cycle of operations considerable time is saved due to the rapidity and simplified manner in which the automatic control and the manual control supplant each other.

I claim as my invention:

1. In a machine tool, the combination of a prime mover, a spindle driven thereby, a feed shaft, means for driving said feed shaft from said spindle including a feed clutch, a plurality of tool supports connected to said feed shaft for movement thereby, manually operable means for moving said tool supports when said feed clutch is disengaged, and means for engaging said feed clutch by movement of said tool supports by said manually operable means through a predetermined position.

2. In a machine tool, the combination of a prime mover, a spindle, a main clutch connecting said prime mover to said spindle, a feed shaft, means for driving said feed shaft from said spindle including a feed clutch, a plurality of tool supports connected to said feed shaft for movement thereby, manually operable means for moving said tool supports when said feed clutch is disengaged, and control means operable by the movement of one of said tool supports in the working direction to engage the main clutch and subsequently to engage said feed clutch.

3. In a machine tool, the combination of a prime mover, a spindle, means for driving said spindle from said prime mover including a main clutch, a feed shaft, means for driving said feed shaft from said prime mover including a feed clutch, a plurality of tool supports connected to said feed shaft for movement thereby, manually operable means for moving said tool supports when said feed clutch is disengaged, and control means actuated at predetermined points by the movement of said tool supports by said manual means to engage the main clutch and the feed clutch at spaced intervals and to disengage said feed clutch after further predetermined movement of said tool supports in the same direction.

4. In a machine tool, the combination of a prime mover, a spindle, means for driving said spindle from said prime mover including a main clutch, a feed shaft, means for driving said feed shaft including a feed clutch, a plurality of work supports connected to said feed shaft for movement thereby, means manually operable to move said tool supports when said feed clutch is disengaged, and control means connected to one of said tool supports operable as the tool support passes a predetermined point under the influence of said manually operable means in one direction to engage the main clutch to drive said spindle, said means being further operable at a predetermined point in the return movement of said manually operable means to disengage said main clutch to stop said spindle.

5. In a machine tool, the combination of a prime mover, a spindle, means for driving said spindle from said prime mover including a main clutch, a feed shaft, means for actuating said feed shaft from said spindle including a feed clutch, a plurality of tool supports, means drivingly connecting said tool supports to said feed shaft, manually operable means for moving said tool supports when said feed clutch is disengaged, and automatically operating control means actuated by the movement in one direction of one of said tool supports at predetermined points to effect successive engagements of said main clutch and said feed clutch, and to disengage said feed clutch after a further predetermined movement of said tool support, said control means being further operable upon movement of said tool support in the opposite direction to disengage said main clutch.

6. A machine tool having, in combination, a bed, a tool support movable longitudinally thereof, a rotatably mounted spindle for the work, driving means for the spindle including a main clutch, driving means for moving the tool support at a feed rate in one direction, means for disengaging the driving means from the tool support, manually operable means for moving said tool support when the tool support is disengaged from the driving means, and control means operable by the movement of said tool support to effect an engagement and a subsequent disengagement of the driving means from said tool support.

7. A machine tool having, in combination, a bed, a plurality of tool supports movably mounted thereon, driving means for the tool supports including a feed shaft and a feed clutch, means for driving said feed shaft at a feed rate, manually operable means for moving said tool supports simultaneously when said feed clutch is disengaged, and a control means operable at a predetermined point by the approach of said one of the tool supports to the work to engage said feed clutch.

8. A machine tool having, in combination, a bed, a carriage movable longitudinally thereof, a rotatably mounted spindle for the work, driving means for the spindle including a main drive clutch, driving means for moving the carriage in one direction at a feed rate including a feed clutch, manually operable means for moving said carriage when said feed clutch is disengaged, and control means operable during the manual movement of said carriage to engage said main clutch to drive said spindle and subsequently to engage said feed clutch to supplant the manual movement of said carriage with the power driven feed movement thereof, said control means being further operable after a feeding movement of said carriage through a predetermined distance to disengage said feed clutch.

9. A machine tool having, in combination, a bed, a carriage movable longitudinally thereof, a rotatably mounted spindle for the work, driving means for the spindle, means including a feed clutch for driving the carriage at a feed rate, manually operable means for moving said carriage when said feed clutch is disengaged, and a control means operable at a predetermined point in the manually effected approach of said carriage to the work to engage said feed clutch.

10. In a lathe, having in combination, a bed, a carriage moving longitudinally thereof, a cross slide movable transversely thereof, a common feed shaft for driving the carriage and cross slide, means for driving said feed shaft at a feed rate, and two means drivingly connecting said carriage to said feed shaft and said cross slide to said feed shaft, each of said two means including a change speed mechanism to permit adjustment of one independently of the other and one of said means being operable to transmit power and movement from said carriage to said feed shaft.

11. A lathe having, in combination, a bed, a carriage movable longitudinally thereof, a cross slide movable transversely thereof, a driven feed shaft for moving said carriage and said cross slide at a feed rate and two separate means each including pick-off gears for operatively connecting said feed shaft with the carriage and with the cross slide, said means being operable to transmit power and movement from said shaft to said carriage and cross slide or vice versa.

12. A lathe having, in combination, a bed, a carriage movable longitudinally of said bed, manually operable means for moving said carriage comprising a rack carried by said carriage and a manually rotatable pinion mounted on the bed and engaged in said rack, and power driven means for feeding said carriage including a feed shaft and means including a pair of pick-off gears connecting said feed shaft and rack.

13. A lathe having, in combination, a bed, a carriage movable longitudinally of said bed, clutch controlled driving means providing a feeding movement of said carriage in one direction, manually operable means for moving said carriage when said driving means is disengaged therefrom, said manually operable means comprising a bar mounted on said carriage and extending from one end of the carriage longitudinally of the bed, a shaft journaled in said bed adjacent one side of said bar, means for manually rotating said shaft, and a rack and pinion between said shaft and said bar.

14. A lathe having, in combination, a bed, a carriage movable longitudinally thereof, a bar rigidly secured to said carriage and extending longitudinally of the bed from either side of said carriage, means for driving said carriage including a rack carried by one end of said bar and a driven pinion operatively engaging said rack, and means for manually moving said carriage including a rack on the opposite end of said bar and a pinion engaging said rack rotatably mounted on said bed.

15. A lathe having, in combination, a bed, a carriage movable longitudinally thereof, a bar rigidly mounted on said carriage and extending longitudinally of the bed from either side of said carriage, power driving means for said carriage including a rack and pinion engaging one end of said bar, and manually operable means for moving said carriage including a rack and pinion engaging the other end of said bar.

16. A lathe having, in combination, a bed, a tool support movable longitudinally thereof, a bar carried by said tool support extending longitudinally of the bed from each side of the tool support, driving means engaging one end of said bar to move said tool support at a feed rate, and means engaging the other end of said bar manually operable to actuate said tool support through the traverse movement thereof.

17. A lathe having, in combination, a bed, a tool support movable longitudinally thereof toward and from a piece of work, a member carried by said tool support and extending longitudinally of the bed, means for moving said tool support at a feed rate, and manually operable means engaging said member to actuate said tool support through the traverse movement thereof, said manually operable means having a grip portion movable in the same direction as the tool support.

18. A lathe having, in combination, a bed, a tool support movable longitudinally thereon toward and away from a piece of work, and manually operable means including a hand wheel rotatably mounted on the bed at the tailstock end thereof, and means connecting said wheel to said tool support for effecting such movement operable to move said tool support in the direction of movement of the upper portion of the hand wheel.

19. In a lathe, in combination with a rotatable spindle and a movable carriage, a pair of clutches for controlling the operation of said spindle and carriage, and automatic means for engaging and disengaging said clutches comprising clutch actuating elements connected to each clutch, a trip device movable with said carriage arranged to engage and actuate one of said clutch elements as said carriage moves in one direction, a second trip device also movable with said carriage arranged to engage and reverse the action of said clutch element as the carriage moves in the other direction, and a third trip device operable upon the other of said clutch actuating elements.

20. In a lathe, in combination with a spindle and a movable carriage, a pair of clutches controlling the operation of said spindle and carriage, and means operable automatically to engage and disengage said clutches, comprising clutch actuating elements connected to each of said clutches, a member movable with said carriage, a pair of trip devices mounted in spaced relation on said member arranged to move into operating engagement with one of said clutch actuating elements as said carriage is moved in one direction or the other to engage or disengage said clutch, and means connecting said trip actuated element to the other of said elements for movement therewith as said trip actuated element is moved in the clutch engaging direction.

21. In a lathe, in combination with a spindle and a movable carriage, a spindle clutch and a carriage feed clutch for controlling the respective operative movements thereof, and means for automatically effecting the engagement and disengagement of said clutches comprising a clutch actuating element connected to each of said clutches, a trip device movable with said carriage to engage and actuate said spindle clutch element in a clutch engaging direction, means connecting said spindle and carriage clutch elements to effect a corresponding movement of said carriage clutch element as said spindle clutch element is moved in the clutch engaging direction, means movable with said carriage for disengaging said carriage clutch element independently of the other element, and a second trip device also movable with said carriage for moving said spindle clutch element in the disengaging direction.

22. A lathe having, in combination with a spindle and a movable carriage, a spindle clutch and a carriage feed clutch for controlling the respective operative movements of said spindle and carriage, and means for automatically controlling said clutches, said means comprising a spindle clutch actuator and a carriage clutch actuator operatively connected to each of said clutches respectively, means connecting said carriage clutch actuator to said spindle clutch actuator to effect a movement of said carriage clutch actuator in a clutch engaging direction as said spindle clutch actuator is moved in a clutch engaging direction, a trip device movable with said carriage into engagement with said spindle clutch actuator to move said actuator in a clutch engaging direction, a second trip device also movable with said carriage into engagement with said carriage clutch actuator to move said actuator in a clutch disengaging direction, and a third trip device also movable with said carriage into engagement with said spindle clutch actuator to move said actuator in a disengaging direction.

23. In a lathe, in combination with a rotatable spindle and a movable carriage, a pair of clutches for controlling the operation of said spindle and carriage, and automatic means for engaging and disengaging said clutches comprising clutch actuating elements connected to each clutch, a trip device movable with said carriage arranged operably to engage one of said actuating elements only as said carriage moves in one direction to effect an engagement of the corresponding clutch, a second trip device also movable with the carriage and positioned in spaced relation to said first mentioned trip device and arranged to engage the same actuating element to disengage the clutch only as the carriage moves in a reverse direction, and means for actuating the other clutch element.

24. In a lathe, in combination with a rotatable spindle and a movable carriage, a pair of clutches for controlling the operation of said spindle and carriage, and automatic means for engaging and disengaging said clutches comprising clutch actuating elements connected to each clutch, a member movable in accordance with said carriage and extending to a position adjacent said actuating elements, a pair of ratchet devices mounted for rotation in opposite directions on said member, one of said devices being operable as said carriage moves in one direction to engage and move said spindle clutch element in a clutch engaging direction and the other of said ratchet devices being capable of reversing the movement of said element to disengage the spindle clutch as the carriage moves in the other direction, a lost motion connection interposed between said spindle clutch element and said carriage clutch element operable as the spindle clutch element is moved in the clutch engaging direction to effect a subsequent movement of said carriage clutch element also in a clutch engaging direction, and means carried by said member and movable therewith into engagement with said carriage clutch element to move said element in a clutch disengaging direction.

25. In a machine tool, the combination of a prime mover, a spindle and a carriage, one of which supports the work and the other the tool, a clutch between the prime mover and the spindle, a driving connection between the spindle and the carriage, a clutch in said connection, and mechanism operable by the carriage for operating said clutches.

26. In a machine tool, the combination of a prime mover, a spindle and a carriage, one of which supports the work and the other the tool, a clutch between the prime mover and the spindle, a driving connection between the spindle and the carriage, a clutch in said connection, manual means for moving the carriage, and mechanism operable by the carriage when moved in the working direction by said manual means for throwing in the first clutch and the second clutch in the order stated.

27. In a machine tool, the combination of a spindle and a carriage, one of which supports the work and the other the tool, a clutch controlling the supply of power to the spindle, a clutch controlling the supply of power to the carriage, manual means for moving one of said parts (namely, the spindle and the carriage), and mechanism operable by said manually operable part when moved in the working direction by said manual means for throwing in the first clutch and the second clutch in the order stated.

28. In a machine tool, the combination of a spindle and a carriage, one of which supports the work and the other the tool, means controlling the supply of power to the spindle, means controlling the supply of power to the carriage, manual means for moving one of said parts (namely, the spindle and the carriage), and mechanism operable by said manually operable part when moved in the working direction by said manual means for throwing in the first controlling means and the second controlling means in the order stated.

29. In a machine tool, the combination of a spindle and a carriage, one of which supports the work and the other the tool, a clutch controlling the supply of power to the spindle, a clutch controlling the supply of power to the carriage, a hand wheel and connections for moving one of said parts (namely, the spindle and the carriage) in opposite directions, and mechanism operable by said manually operable part for engaging and disengaging both of said clutches.

30. In a machine tool, the combination of a prime mover, two movable parts, one of which supports the work and the other the tool, a clutch between the prime mover and one of said parts, a driving connection between said parts, a clutch in said connection, manual means for moving the other of said parts, and mechanism operable by said other part when moved in a certain direction by said manual means for throwing in the first clutch and the second clutch in the order stated.

31. In a machine tool, the combination of a spindle and a carriage, one of which supports the work and the other the tool, a clutch controlling the operation of the spindle, a clutch controlling the supply of power to the carriage, manual means for moving the carriage, and mechanism operable by the carriage when moved in the working direction by said manual means for throwing in the first clutch and the second clutch in the order stated.

32. In a lathe, the combination of a prime mover, a work-supporting spindle, a tool carriage, a clutch between the prime mover and the spindle, a driving connection between the spindle and the carriage, a clutch in said connection, manual means for moving the carriage in opposite directions, and mechanism operable by the carriage when moved in the working direction by said manual means for throwing in the first clutch and the second clutch in the order stated, said mechanism being operable by the carriage when continuing to move in said direction to throw out the second clutch, and being operable by the carriage when moved in the opposite direction to throw out the first clutch.

33. In a machine tool, the combination of a spindle and a carriage, one of which supports the work and the other the tool, a clutch controlling the supply of power to the spindle, a clutch controlling the supply of power to the carriage, manual means for moving the carriage in opposite directions, and mechanism operable by the carriage when moved in the working direction by said manual means for throwing in the first clutch and the second clutch in the order stated, said mechanism being operable by the carriage when continuing to move in said direction to throw out the second clutch, and being operable by the carriage when moved in the opposite direction to throw out the first clutch.

34. In a machine tool, the combination of two movable parts, one of which supports the work and the other the tool, means controlling the supply of power to one of said parts, means controlling the supply of power to the other part, manual means for moving one of said parts in opposite directions, and mechanism operable by the last mentioned part when moved in the working direction by said manual means for throwing in the first controlling means and the second controlling means in the order stated, said mechanism being operable by the last mentioned part when continuing to move in said direction to throw out the second controlling means, and being operable by the last mentioned part when moved in the opposite direction to throw out the first controlling means.

35. In a machine tool, two clutch-controlling members mounted for pivotal movement on parallel axes, two pins on one of said members, a reciprocatory part, two ratchet members on said part, one of which is adapted to engage one of said pins to throw in the corresponding clutch upon movement of said part in one direction, the other ratchet member being arranged to engage the other pin to throw out the corresponding clutch upon movement of said part in the other direction, a lost-motion connection between said clutch-controlling members whereby the member that carries said pins is arranged to move the other clutch-controlling member to throw in the corresponding clutch, and a stop member on said reciprocatory part arranged to engage and move said other clutch-controlling member to throw out the corresponding clutch.

36. In a machine tool, a bed, a carriage movable along the bed, manual means for moving the carriage in opposite directions, a power drive for moving the carriage in a certain direction, and a control for said drive arranged to be actuated by the carriage when manually moved in the last mentioned direction to cause continuing movement of the carriage in that direction under power, and arranged to be actuated by the carriage in such continuing movement to interrupt movement of the carriage under power.

In testimony whereof, I have hereunto affixed my signature.

ERNEST J. SVENSON.